United States Patent

Ochiai et al.

(10) Patent No.: US 9,488,506 B2
(45) Date of Patent: Nov. 8, 2016

(54) RESOLVER

(71) Applicant: MINEBEA CO., LTD., Kitasaku-gun, Nagano (JP)

(72) Inventors: Takaaki Ochiai, Yachimata (JP); Shumei Shirayanagi, Hamamatsu (JP); Fujito Kawai, Hamamatsu (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 332 days.

(21) Appl. No.: 13/955,616

(22) Filed: Jul. 31, 2013

(65) Prior Publication Data

US 2014/0084758 A1 Mar. 27, 2014

(30) Foreign Application Priority Data

Sep. 26, 2012 (JP) ................................. 2012-212508
Oct. 22, 2012 (JP) ................................. 2012-232755

(51) Int. Cl.
| | |
|---|---|
| *H02K 11/00* | (2016.01) |
| *G01D 11/24* | (2006.01) |
| *G01D 5/20* | (2006.01) |
| *H02K 24/00* | (2006.01) |
| *H02K 1/18* | (2006.01) |

(52) U.S. Cl.
CPC ................ *G01D 11/24* (2013.01); *G01D 5/20* (2013.01); *H02K 1/185* (2013.01); *H02K 24/00* (2013.01)

(58) Field of Classification Search
CPC .. H02K 11/0031; H02K 1/185; H02K 24/00; G01D 5/20; G01D 11/24
USPC ........................................................ 310/68 B
See application file for complete search history.

(56) References Cited

U.S. PATENT DOCUMENTS

| | | | | |
|---|---|---|---|---|
| 4,580,471 A | * | 4/1986 | Oyama ..................... | B23Q 5/10 310/90 |
| 5,783,888 A | * | 7/1998 | Yamano ................... | H02K 5/04 310/216.137 |
| 5,859,425 A | | 1/1999 | Mleinek et al. | |
| 6,462,457 B2 | * | 10/2002 | Shah ......................... | H02K 1/16 310/182 |
| 6,512,314 B1 | * | 1/2003 | Nakanishi ............... | H02K 1/185 310/49.01 |
| 6,798,094 B2 | * | 9/2004 | Hirsou ..................... | H02K 5/15 310/51 |
| 7,203,281 B2 | * | 4/2007 | Smith .................... | H01J 35/101 378/131 |
| 7,567,010 B1 | * | 7/2009 | Farnia ..................... | H02K 1/185 310/216.067 |
| 7,868,497 B2 | * | 1/2011 | Miyairi ................... | H02K 5/10 310/51 |
| 8,169,111 B2 | | 5/2012 | Yoshimura | |
| 8,227,948 B1 | * | 7/2012 | Fox .......................... | H02K 1/06 310/50 |
| 2004/0124720 A1 | * | 7/2004 | Condamin ............... | H02K 5/24 310/51 |

(Continued)

FOREIGN PATENT DOCUMENTS

| | | |
|---|---|---|
| JP | H10-122902 A | 5/1998 |
| JP | 2006254562 A | 9/2006 |

(Continued)

OTHER PUBLICATIONS

Apr. 7, 2016 Office Action Issued in U.S. Appl. No. 14/829,154.

(Continued)

*Primary Examiner* — Alex W Mok
(74) *Attorney, Agent, or Firm* — Oliff PLC

(57) ABSTRACT

A resolver can have a stator installed in a housing simply, without requiring a special jig. In the resolver including a housing and a stator core fixed in the housing, the stator core is fixed to the inside of the housing by rotating relative to the housing.

6 Claims, 7 Drawing Sheets

(56) References Cited

U.S. PATENT DOCUMENTS

| | | |
|---|---|---|
| 2007/0235248 A1 | 10/2007 | Matsubara et al. |
| 2008/0024021 A1* | 1/2008 | Tsukashima ......... G01D 5/2046 310/68 D |
| 2008/0054737 A1* | 3/2008 | Inayama ................ H02K 1/148 310/44 |
| 2009/0273258 A1* | 11/2009 | Aiello ................... H02K 1/185 310/425 |
| 2010/0097053 A1* | 4/2010 | Kikuchi ............ H02K 11/0031 324/207.25 |
| 2011/0175496 A1 | 7/2011 | Shirakata et al. |
| 2012/0049686 A1* | 3/2012 | Mizuike .................. H02K 1/28 310/156.53 |

FOREIGN PATENT DOCUMENTS

| | | |
|---|---|---|
| JP | A-2010-172164 | 8/2010 |
| JP | A-2010-178603 | 8/2010 |
| JP | A-2010-190598 | 9/2010 |

OTHER PUBLICATIONS

Jun. 10, 2016 Office Action issued in Japanese Application No. 2012-212508.

Jun. 20, 2016 Office Action issued in Japanese Application No. 2012-232755.

\* cited by examiner

RESOLVER

BACKGROUND OF THE INVENTION

1. Field of the Invention

The present invention relates to a resolver having a specific structural characteristic for fixing a stator in a housing.

2. Description of Related Art

In a structure of a resolver for fixing a stator in a housing, when the housing is clamped and fixed to the stator by pressing, the housing is often cracked, depending on the material or shape of the housing. In addition, when a clamping deformation amount in a shape is decreased in order to prevent generating a crack, the strength tends to be reduced. As a resolver structure in which a stator is fixed in a cylindrical case (housing), techniques described in Japanese Unexamined Patent Application Laid-open No. 2010-190598, Japanese Unexamined Patent Application Laid-open No. 2010-178603 and Japanese Unexamined Patent Application Laid-open No. 2010-172164, are known. In addition, as a resolver structure in which a stator is fixed in a housing, a method using an adhesive is known (see Japanese Unexamined Patent Application Laid-open No. 2010-178603).

SUMMARY OF THE INVENTION

A technique using an ultrasonic welding is disclosed in Japanese Unexamined Patent Application Laid-open No. 2010-190598, a technique using an adhesive is disclosed in Japanese Unexamined Patent Application Laid-open No. 2010-178603, and a technique using a rivet is disclosed in Japanese Unexamined Patent Application Laid-open No. 2010-172164. In the case in which the ultrasonic welding is used, equipment and a horn for welding are required. In the case in which the adhesive is used, there are problems such as curing time, generation of outgasing after adhering, etc. In the case in which the rivet is used, the rivet and a specific apparatus for using the rivet are required. In view of such circumstances, it is an object of the present invention to provide a resolver in which a stator is simply installed in a housing without requiring a special jig.

In the fixing structure using the adhesive, there is a problem in that the adhesive strength is decreased by aging, and the stator is loosened in the housing, and as a result, the stator may come off the housing. In view of such circumstances, it is an object of the present invention to provide a technology in which a fixed state is prevented from deteriorating due to aging in a resolver structure in which the stator is fixed in the housing using an adhesive or filler.

A first aspect of the present invention has a resolver including: a housing in an approximately cylindrical shape, a stator core in an approximately annular shape fixed to the inside of the housing, and a rotor core arranged on the inside of the stator core, in which the stator core is fixed to the inside of the housing by rotating relative to the housing.

A second aspect of the present invention has the resolver according to the first aspect, in which the housing is formed by aluminum die-casting.

A third aspect of the present invention has the resolver according to the first aspect, in which a concavity is provided on the outside of the stator core, an engaging portion which engages with the stator core is provided on the inside of the housing, the engaging portion comprises a circumferential direction contacting portion which contacts in a circumferential direction with a step portion of the concavity and an axial direction contacting portion which contacts in an axial direction with an end surface of the stator core.

A fourth aspect of the present invention has the resolver according to the third aspect, in which a receiving portion which contacts with an end surface in an axial direction of the stator core is provided on the inside of the housing, and the stator core is held between the receiving portion and the axial direction contacting portion.

A fifth aspect of the present invention has the resolver according to the third aspect, in which a portion which contacts with the stator core of the axial direction contacting portion is inclined in a circumferential direction.

A sixth aspect of the present invention has a resolver including: a stator in which an exciting coil and a detecting coil are wound therearound, a rotor arranged on the inside of the stator, and a housing arranged on the outside of the stator, in which a cavity is formed between the stator and the housing, a convexity is formed on the inside of the housing facing the cavity, an engaging portion is provided on the outside of the stator facing the cavity, and an adhesive or filler is filled into the cavity.

According to the sixth aspect of the present invention, the cured adhesive or filler is structurally engaged with the convexity on the housing, and moreover, it is engaged with the engaging portion of the stator. Therefore, in the structure in which the stator is fixed in the housing using the adhesive or filler, a fixed state is prevented from deteriorating due to aging. Here, the stator means a portion formed by a stator core and members installed in the stator core (for example, an insulator). As an adhesive or filler, adhesives or fillers having strength sufficient to hold a shape in a cured state can be used.

A seventh aspect of the present invention has the resolver according to the sixth aspect, in which the stator includes a stator core and an insulator installed in the stator core, and the engaging portion has a step structure formed between the stator core and the insulator. According to the seventh aspect of the present invention, moving in an axial direction of the stator against the housing, is controlled by engaging the cured adhesive or filler with the step structure.

A eighth aspect of the present invention has the resolver according to the sixth aspect, in which a receiving surface which supports the stator in an axial direction is provided on the inside of the housing, moving in one axial direction of the stator against the housing is controlled by the receiving surface, and moving in the other axial direction of the stator against the housing is controlled by the engaging portion. According to the eighth aspect of the present invention, moving in an axial direction of the stator against the housing, is controlled.

A ninth aspect of the present invention has the resolver according to the sixth aspect, in which the engaging portion is at least one of an inclined portion, a step portion, a concavity and a convexity, provided on the outside of the stator facing the cavity. According to the ninth aspect of the present invention, the engaging structure formed by at least one of an inclined portion, a step portion, a concavity and a convexity, is structurally engaged with the adhesive or the filler in the cavity, and the stator is structurally bound with the adhesive or the filler, even if an adhesion effect is not obtained.

A tenth aspect of the present invention has the resolver according to the sixth aspect, in which the housing is formed by aluminum die-casting. An eleventh aspect of the present invention has the resolver according to the sixth aspect, the housing is made of resin.

According to the tenth aspect of the present invention, a resolver, in which a stator can be simply installed in a housing, without requiring a special jig, can be provided. In addition, according to the eleventh aspect of the present invention, in a resolver structure in which a stator is fixed in a housing using an adhesive or filler, a technology that prevents deterioration of a fixed state due to aging can be provided.

PREFERRED EMBODIMENTS OF THE INVENTION

1. First Embodiment

Structure

Figure 1:
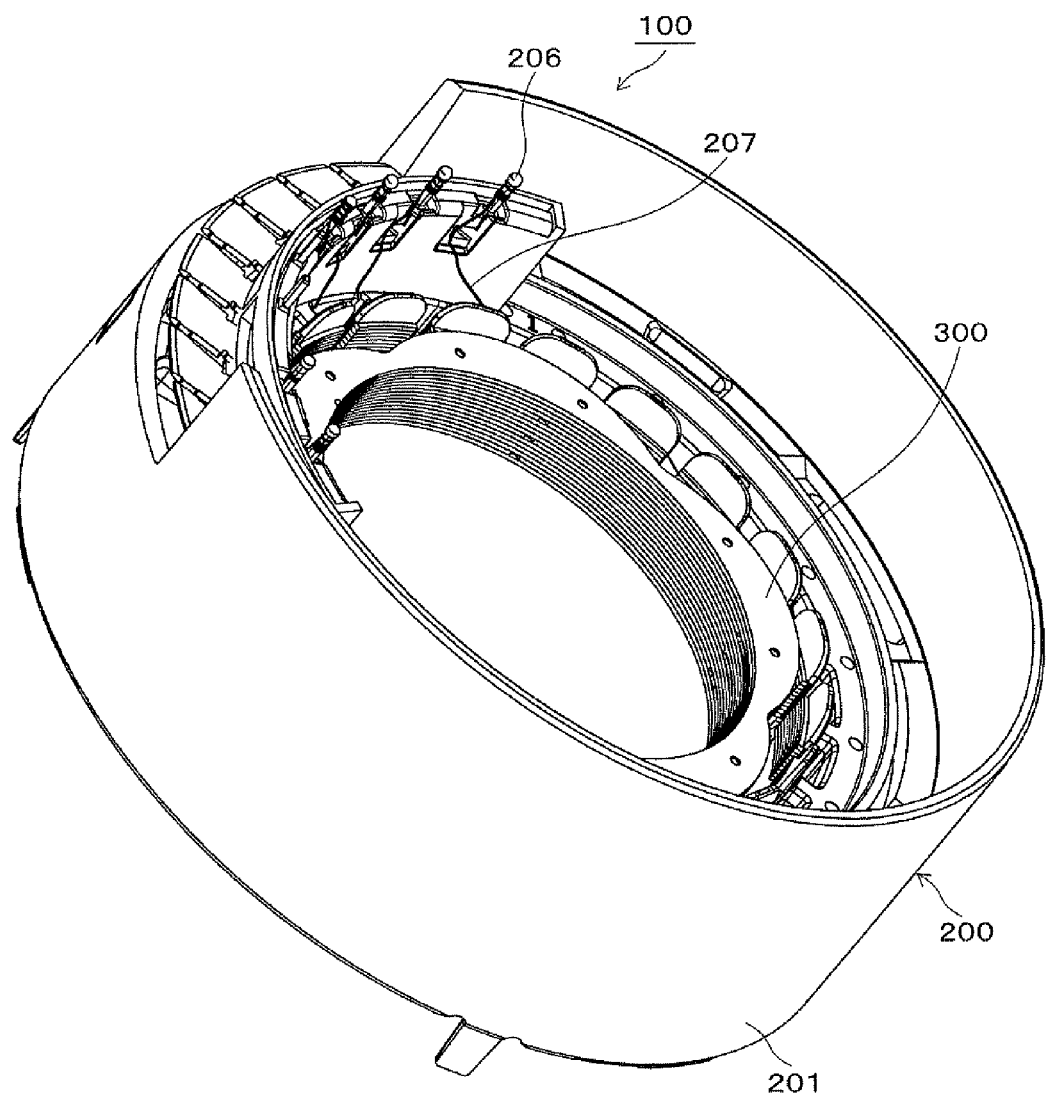
FIG. 1 is a perspective view showing a resolver of an embodiment of the present invention.
Figure 2:
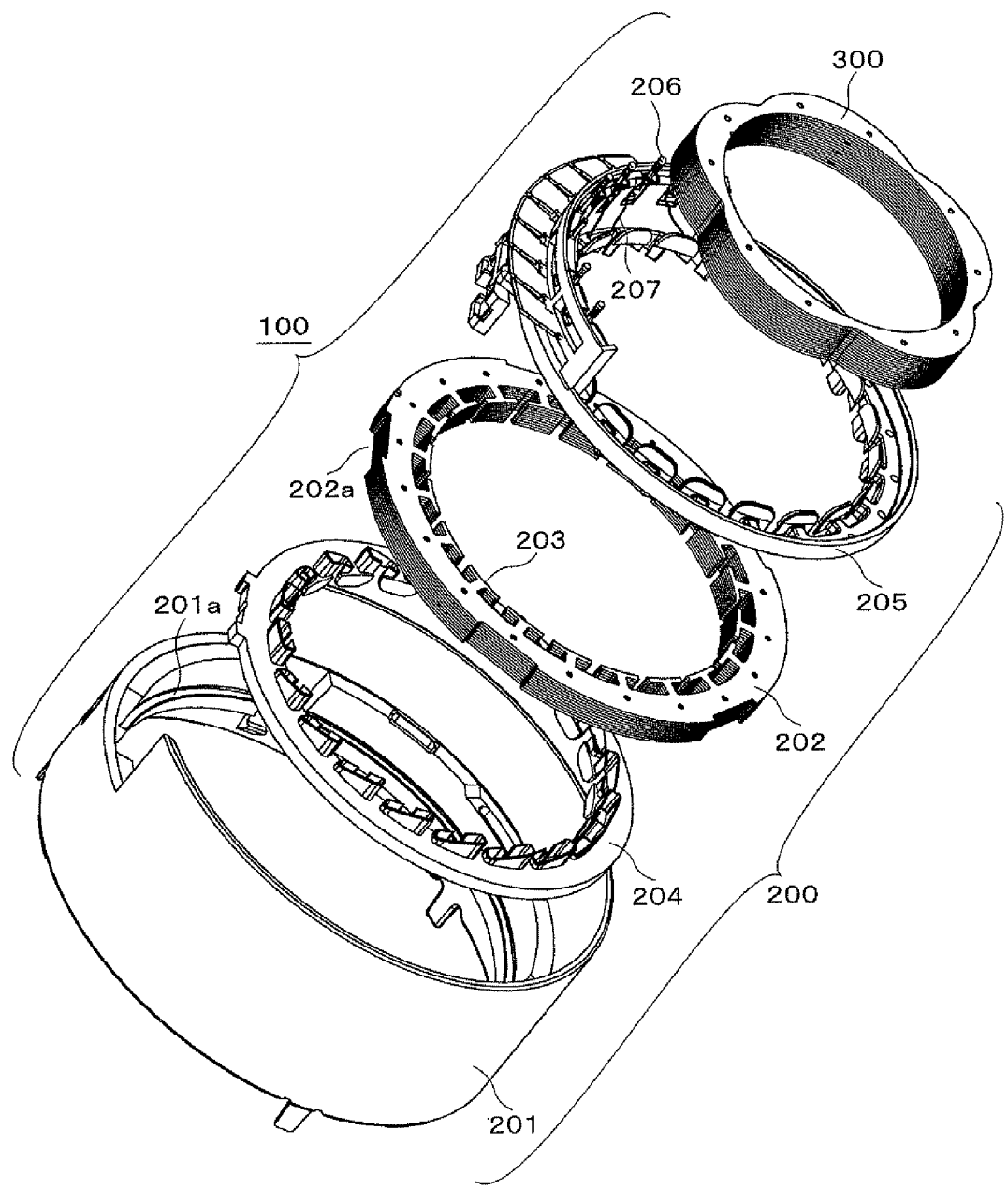
FIG. 2 is an exploded perspective view showing a resolver of an embodiment of the present invention.

FIG. 1 shows a resolver 100 of an embodiment of the present invention. FIG. 2 shows an exploded perspective view in which the resolver 100 is exploded in an axial direction. The resolver 100 is a VR type resolver, and it contains a stator 200 in an approximately cylindrical shape and a rotor core 300 rotatably arranged in the stator 200.

The stator 200 has a housing 201 in an approximately cylindrical shape formed by aluminum die-casting. A stator core 202 in an approximately annular shape is installed on the inside of the housing 201. A stator core receiving surface 201a for supporting an edge of one end surface of the stator core 202 in an axial direction is formed on the inside of the housing 201, and the stator core 202 is contacted with this stator core receiving surface 201a in an axial direction.

The stator core 202 has a structure in which a plurality of tabular magnetic members in an approximately annular shape (for example, electromagnetic steel plate) are laminated in an axial direction. The stator core 202 has a plurality of salient poles 203 which extend in an axial center direction. Here, the axis means a rotational axis of the rotor core 300. The salient pole 203 is a part which functions as a magnetic pole on the stator, and a plurality of the salient poles are placed along a circumferential direction. A stator coil, which is not shown in FIGS. 1 and 2, is wound around the salient pole 203. The stator coil contains an exciting coil and an output coil (a sine phase detecting coil and a cosine phase detecting coil). Detailed explanation of the structure of the stator coil is here omitted since it is the same as that of a common resolver.

Insulators 204, 205 made of resin are installed on both surfaces in an axial direction of the stator core 202. Exposed parts of extending portions which extend in the axial center direction of the salient poles 203 are insulated by the insulators 204, 205, and the stator coils are wound around the parts. Lead-out lines 207 are led out from the stator coils, which are not shown, and the lead-out lines 207 are connected with terminal pins 206 embedded into the insulator 205.

Stator grooves 202a are formed on the stator core 202. The stator grooves 202a have recessed portions in an approximately rectangle shape when they are viewed from an axial direction, and have a groove structure in which a cross-sectional shape thereof extends in an axial direction. In this embodiment, the stator grooves 202a are formed at seven positions on a circumference of the stator core 202 which are equiangular when they are viewed from an axial direction. Here, the number of the stator grooves 202a is not limited to that in this embodiment.

A rotor core 300 has an approximately annular shape having the plurality of convexities (five positions in this embodiment) on the circumference when it is viewed from an axial direction. The rotor core 300 has a structure in which a plurality of tabular magnetic members (for example, electromagnetic steel plate) are laminated in an axial direction. A rotor member in a cylindrical shape, which is not shown, is fixed to the inside of the rotor core 300, and a shaft member (a rotating shaft), which is not shown, is fixed to the center of the rotor member. This rotating shaft is rotatably held on the housing 201 by a bearing, which is not shown, and the rotor core 300 can be rotated to the stator 200.

Figure 3:
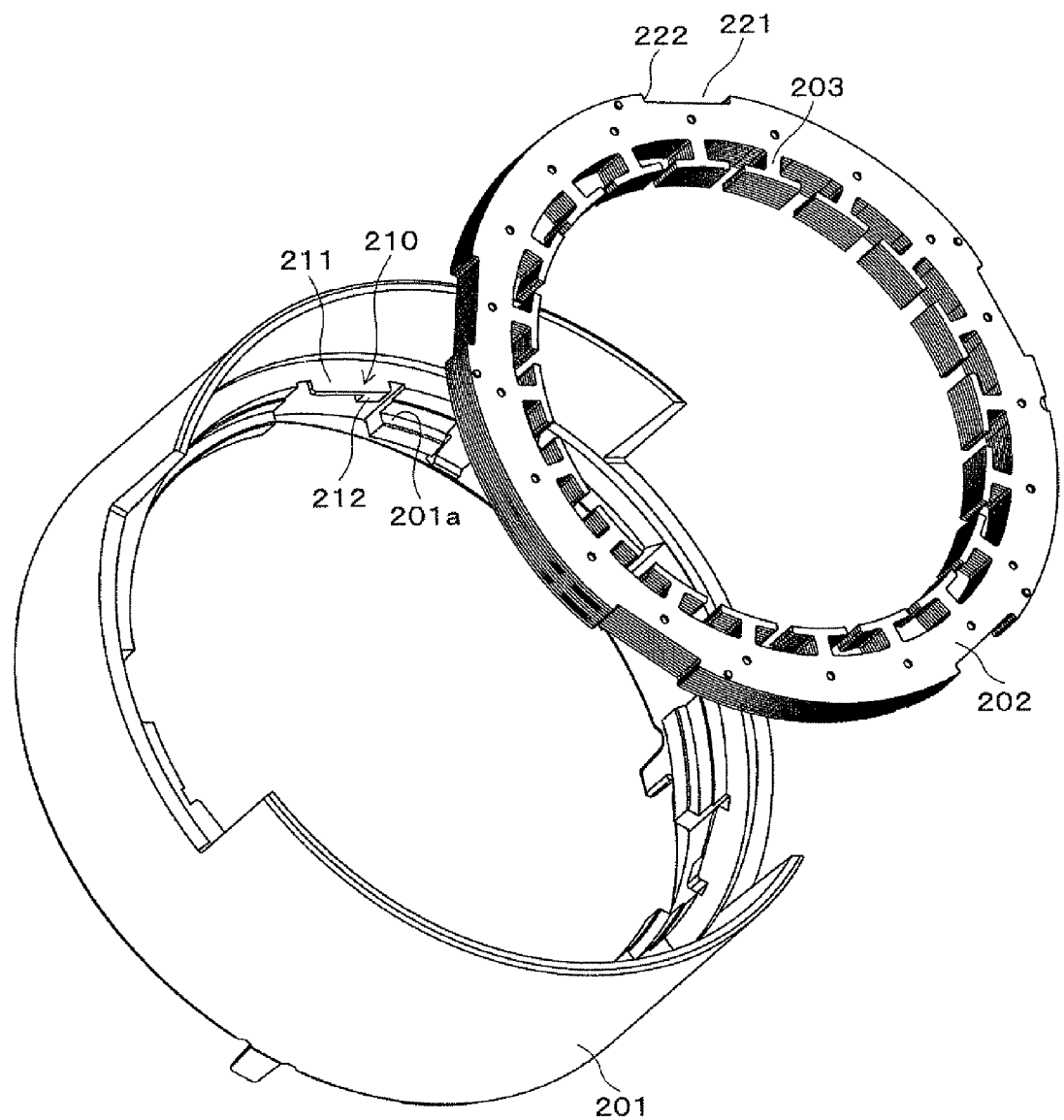
FIG. 3 is an exploded perspective view showing a resolver of an embodiment of the present invention.
Figure 4:
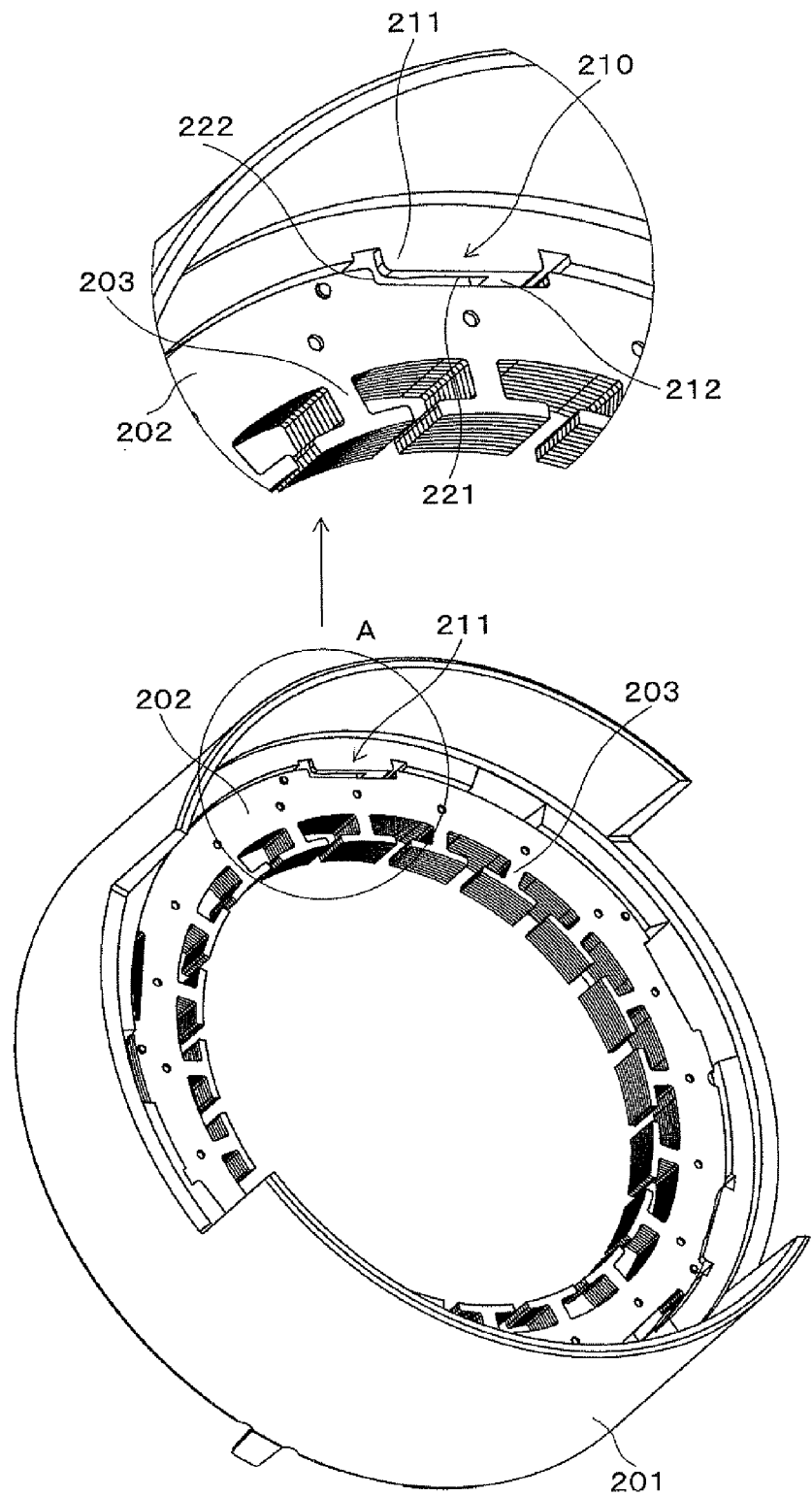
FIG. 4 is a perspective view showing a stator in the present invention and an enlarged view of a part of the stator.
Figure 5:
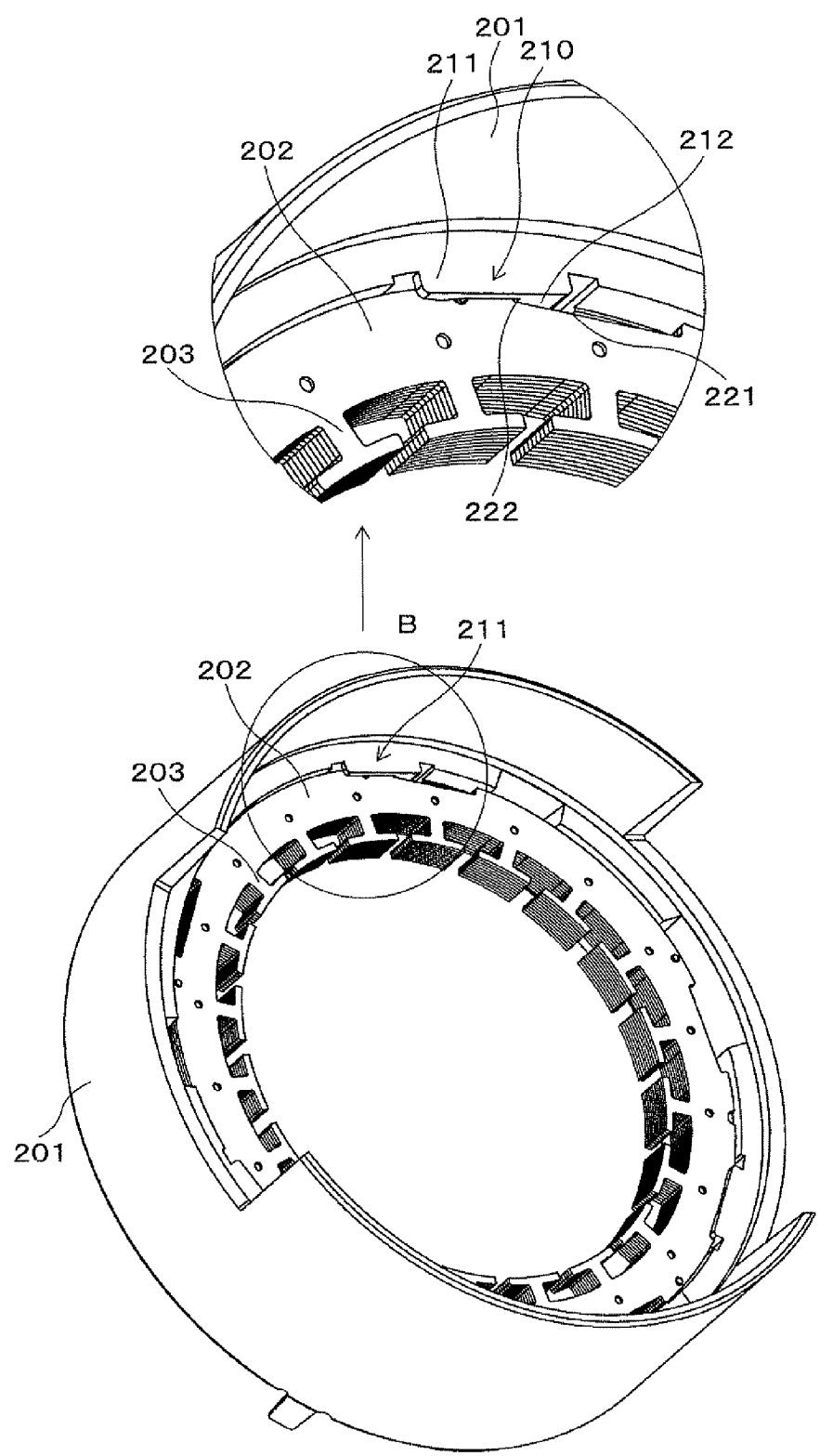
FIG. 5 is a perspective view showing a stator in the present invention and an enlarged view of a part of the stator.

In the following, a structure for fixing the stator core 202 in the housing 201 will be explained. FIG. 3 shows a stage before the stator core 202 is installed in the housing 201. FIG. 4 shows a stage in which the stator core 202 is being installed in the housing 201. FIG. 5 shows a state in which the stator core 202 has been installed in the housing 201.

As shown in FIG. 3, engaging portions 210 are formed on the inside of the housing 201. Size in a circumferential direction of the engaging portions 210 is set to be a size that can be received in concavities 221 of the stator core 202 described below. The engaging portions 210 are convexities that extend along a circumferential direction, and they have axial contacting portions 211 that contact end portions of the stator core 202 in an axial direction. In addition, the engaging portions 210 have step portions 222 of the stator core 202, described below, and circumferential direction contacting portions 212 that contact in a circumferential direction. That is, the engaging portions 210 have an approximately L-shape when they are viewed from a vertical direction to the axis, and a long side portion which extends in a circumferential direction of the L-shape is the axial direction contacting portions 211 and a short side portion which extends in an axial direction of the L-shape is the circumferential direction contacting portions 212.

As shown in FIG. 3, concavities 221 are formed on a circumference of the stator core 202. The concavities 221 have a groove structure that extends in an axial direction, and they are formed at five positions that are equiangular when they are viewed from an axial direction. Here, the above engaging portions 210 are formed at five positions on the circumference of the stator core 202 corresponding to the concavities 221.

Assembly

In the following, an example of an operation procedure for installing the stator core 202 in the housing 201 will be explained. First, in a state shown in FIG. 3, a position in an axial direction of the concavities 221 of the stator core 202 is fitted to a position of the engaging portion 210 of the housing 201, and then, in the fitted state, the stator core 202 is relatively pushed in an axial direction into the housing 201, and an edge of an end portion in an axial direction of the stator core 202 is contacted with the stator core receiving surface 201a. This state is shown in FIG. 4. Here, the size of each portion is adjusted to be the positional relation, so that in the state shown in FIG. 4, when the housing 201 is relatively rotated around the stator core 202, the axial direction contacting portion 211 and an end surface in an axial direction of the stator core 202 are contacted and the circumferential direction contacting portion 212 is finally contacted with the step portion 222. In addition, in this case, the size of each portion is adjusted, so that the stator core 202 is tightly held between the axial direction contacting portion 211 and the stator core receiving surface 201a.

After the state shown in FIG. 4 is formed, the stator core 202 is rotated clockwise on the figure (or the housing 201 is rotated counterclockwise on the figure), and whereby a state shown in FIG. 5 is obtained. In this case, the above rotation is carried out, while a surface of the axial direction contacting portion 211 which faces to the stator core 202 is contacted with an end surface in an axial direction of the stator core 202, and the circumferential direction contacting portion 212 is finally abutted the step portion 222. That is, in the state shown in FIG. 5, the end portion of the stator core 202 is contacted with the axial direction contacting portion 211 of the housing 201, and the circumferential direction contacting portion 212 is engaged to the step portion 222, and therefore, the stator core 202 cannot be further rotated clockwise on the figure.

In this way, a state in which the engaging portion 210 is engaged with the concavities 221 is obtained. In this state, the stator core 202 is inserted between the axial direction contacting portion 211 and the stator core receiving surface 201a (see FIGS. 2 and 3), and the stator core 202 is fixed in the housing 201 by inserting. Here, the above engaged state may be further fixed by an adhesive or by a clamping structure. In addition, the housing 201 may be made of resin material. In this case, it may be fixed using an adhesive after the stator core 202 is rotated and fixed.

Next, the insulators 204, 205 are installed on both surfaces in an axial direction of the stator core 202. Furthermore, stator coils are wound around the salient poles 203 insulated by the insulators 204, 205, and thereby, a state shown in FIG. 1 is obtained.

Here, the housing 201 and the stator core 202 are previously assembled. However, an assembly is obtained by installing the insulators 204, 205 on both surfaces in an axial direction of the stator core 202, and by winding the stator coils around the salient poles 203 insulated by the insulators 204, 205, and this assembly may be installed in the housing 201.

Variations

A surface of the axial direction contacting portion 211 that is contacted with the stator core 202 may be arranged non-parallel to the end surface of the stator core 202 and be inclined, so that it is closed to the stator core 202 as being closed to the circumferential direction contacting portion 212 when it is viewed from a vertical direction to the axis. That is, the surface of the axial direction contacting portion 211 which is contacted with the stator core 202 may have a taper shape which is inclined so as to gradually shorten distance to the stator core 202 as being closed to the circumferential direction contacting portion 212. When this structure is used, the stator core 202 can be more easily and more surely fitted with the housing 201 using the engaging portion 210.

Advantages

According to the above structure in which the housing 201 and the stator core 202 are combined, the stator core can be installed in the housing 201 by inserting the stator core 202 into the housing 201 and rotating it. In this operation, a stator can be simply installed in a housing without a special jig.

2. Second Embodiment

Structure

Figure 6:
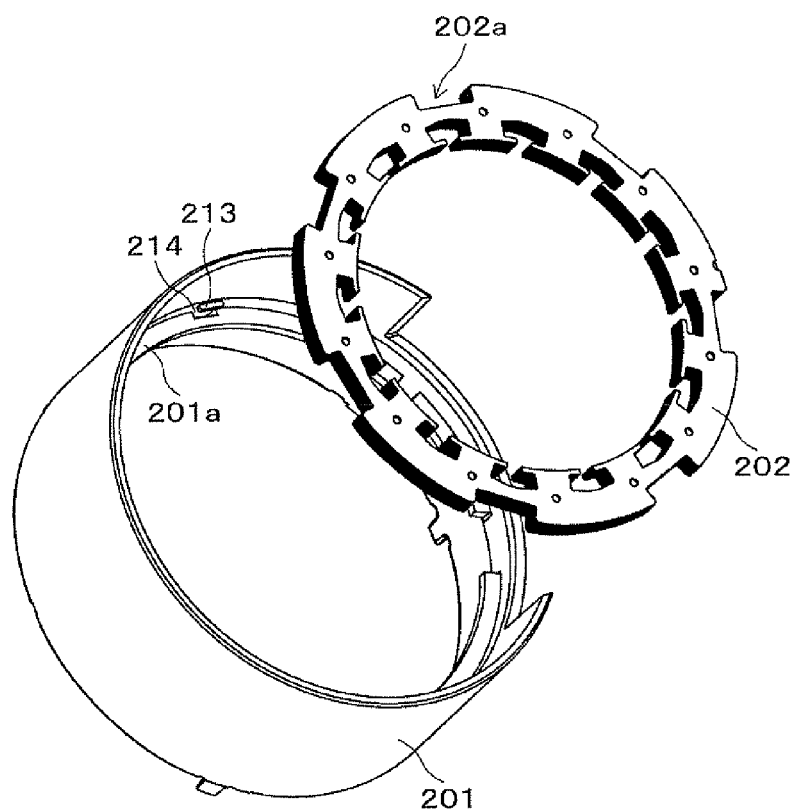
FIG. 6 is an exploded perspective view showing a resolver of an embodiment of the present invention.
Figure 7:
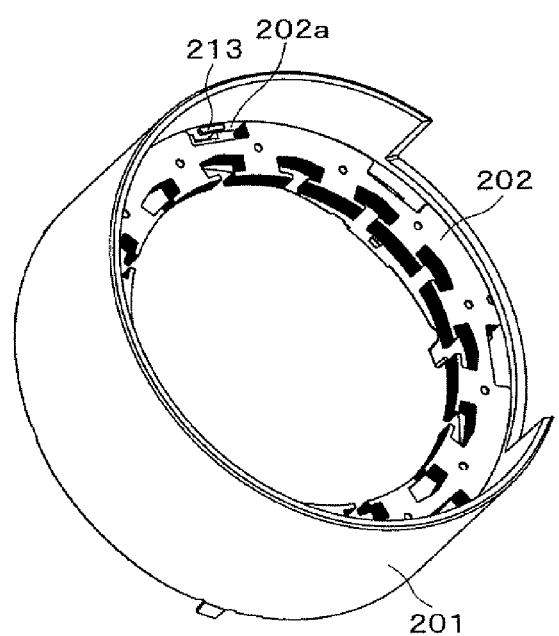
FIG. 7 is a perspective view showing a resolver of an embodiment of the present invention.
Figure 8:
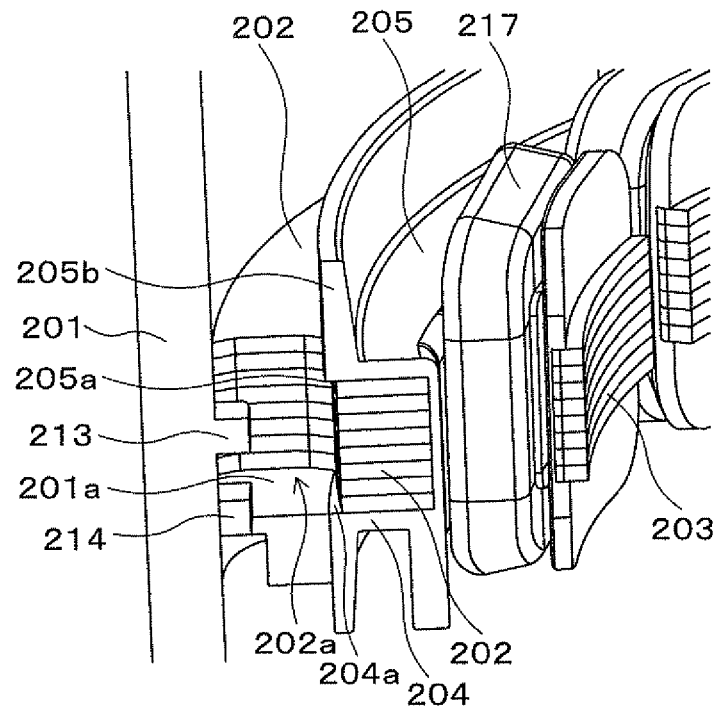
FIG. 8 is a perspective cross sectional view showing an enlarged part of a resolver of an embodiment of the present invention.

Since in the second embodiment, a structure in which a stator core 202 is fixed in a housing 201 is different from that of the first embodiment, in the following, only this structure will be explained. FIG. 6 shows a stage before the stator core 202 is installed in the housing 201. FIG. 7 shows a stage in which the stator core 202 is installed in the housing 201. FIG. 8 shows a state in which insulators 204, 205 and coils 217 are installed in the stage shown in FIG. 7.

A convexity 213 that protrudes in an axial center direction is formed in the housing 201. The convexity 213 is integrally formed with the housing 201 when the housing 201 is integrally molded by casting. A hole 214 for releasing a casting die, which is necessary in forming the convexity 213, is formed in an annular portion that forms a stator core receiving surface 201a.

As described in FIG. 8, the upper insulator 205 has an annular wall 205b. In addition, in the state in which the lower insulator 204 is installed in the stator core 202, an upper portion of an inner edge of the insulator 204 is exposed at a stator groove 202a, and thereby, a step portion 204a is formed. Additionally, a step portion 205a is similarly formed at a side of the insulator 205. That is, in a state in which the upper insulator 205 is installed in the stator core 202, a lower portion of an inner edge of the insulator 205 is exposed at the stator groove 202a, and thereby, the step portion 205a is formed.

Figure 9:
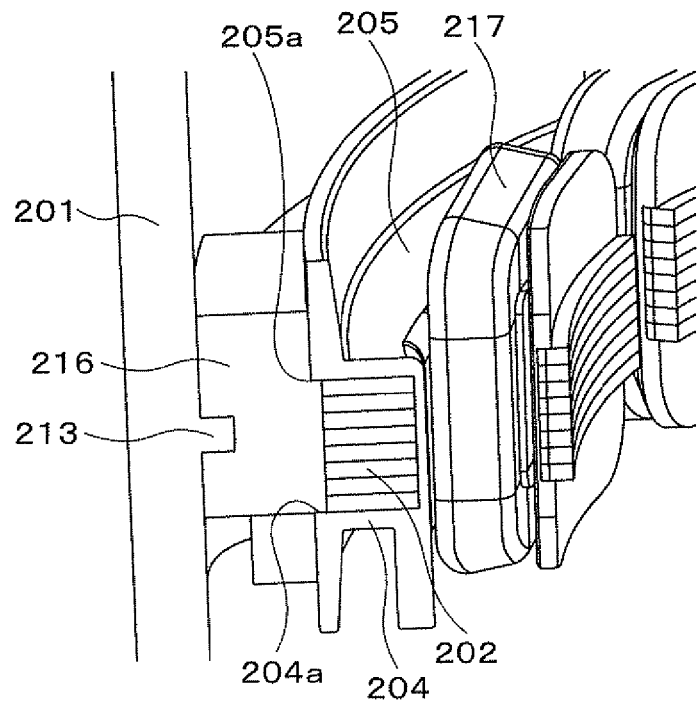
FIG. 9 is a perspective cross sectional view showing an enlarged part of a resolver of an embodiment of the present invention.

Furthermore, in the state shown in FIG. 8, a cavity is formed between the housing 201 and the stator core 202 by the stator groove 202a. In addition, in the upper portion of the stator core 202 also, a cavity is formed between the housing 201 and the annular wall 205b. Here, a state shown in FIG. 9 is obtained by filling an adhesive 216 into the cavity between the housing 201 and the stator core 202 formed by the stator groove 202a. The adhesive 216 is also filled into the cavity between the housing 201 and the annular wall 205b in the upper portion of the stator groove 202a.

The stator core 202 is fixed to the housing 201 by curing the adhesive 216, and it is structurally fixed to the inside of the housing of 201. That is, the cured adhesive 216 is engaged with the housing 201 by a convexity 213 (in the following, this engaging state is described as an anchor effect), and it is engaged with the step portions 204a and 205a in an axial direction. Therefore, the cured adhesive 216 is structurally engaged with the housing 201 in an axial direction, and it is also engaged with a stator member composed of the stator core 202 and the insulators 204, 205 in an axial direction. That is, a structure in which the cured adhesive 216 is engaged with the housing 201 in an axial direction and it is engaged with the stator member composed of the stator core 202 and the insulators 204, 205, is obtained in addition to adhesive strength of the adhesive 216.

Here, in FIGS. 8 and 9, coils 217 containing an exciting coil or an output coil (a sine phase detecting coil or a cosine phase detecting coil) are shown.

Assembly

In the following, an example of a procedure in which the stator core 202 is installed in the housing 201 will be explained. First, in a state shown in FIG. 6, a position in an axial direction of the stator groove 221 of the stator core 201 is fitted to a position of the convexity 213, and in the state, the stator core 202 is relatively pushed in an axial direction into the housing 201, and an edge of an axial direction end portion of the stator core 202 is contacted with the stator core receiving surface 201a. This state is shown in FIG. 7. In the state shown in FIG. 7, the convexity 213 of the housing 201 is located at a portion facing the stator groove 202a of the stator core 202.

Next, the insulators 204, 205 are installed on both surfaces in an axial direction of the stator core 202. In addition, the stator coils are wound around the salient poles 203 insulated by the insulators 204, 205. As a result, a state shown in FIG. 8 is obtained.

After the state shown in FIG. 8 is obtained, the adhesive is filled into the stator groove 202a. In this case, the adhesive is also filled into the cavity between the housing 201 and the annular wall 205b in the upper portion of the stator groove 202a. In this way, a state of the adhesive 216 shown in FIG. 9 is obtained. At this time, the adhesive 216 is also inserted in the hole 214. Then, the stator 202, the insulators 204, 205 and the housing 201 are adhered to each other by curing the adhesive 216.

Here, the cured adhesive 216 is structurally fixed by the anchor effect of the convexity 213 in addition to its own adhesive strength, so as to inhibit transferring to the housing 201. In addition, the cured adhesive 216 is engaged with the step portions 204a and 205a in an axial direction.

Advantages

As described above, the cavity constituted by the stator groove 202a is formed between the stator core 202 and the housing 201, and the convexity 213 is formed at the inside of the housing 201 facing this cavity. The step portion 204a, which is an engaging portion, is formed at a border between the stator core 201 and the insulator 204 facing this cavity, and the step portion 205a, which is an engaging portion, is formed at a border between the stator core 201 and the insulator 205 facing this cavity. Then, the adhesive is filled into the above cavity.

According to this structure, a circumference of the convexity 213 is covered by the adhesive 216, and the convexity 213 is embedded by the cured adhesive 216, and therefore, a fixing strength of the adhesive 216 to the housing 201 can be increased. In addition, the cured adhesive 216 is contacted with the step portion 204a and 205a in an axial direction, and whereby the insulators 204, 205 and the stator core 202 can be more rigidly fixed to the housing 201 in an axial direction.

According to the structure which combines the housing 201 and the stator core 202 in this embodiment, in the state shown in FIG. 9, the step portion 204a is contacted and engaged with the cured adhesive 216 and the cured adhesive 216 is not moved in an axial direction to the housing 201 by the anchor effect of the convexity 213, even if the stator core 202 is pulled up when the adhesive strength of the adhesive 216 is decreased. Therefore, the insulator 204 and the stator core 202 which is united therewith are hardly moved from the housing 201 to an upper direction on the figure.

That is, the stator core 202 is physically fixed to the housing 201 by not only the adhesive strength of the adhesive but also the cured adhesive 216. Therefore, the stator core 202 can be prevented from becoming loose or coming off in the state in which the stator core 202 is fixed to the housing 201, even if the adhesive strength of the adhesive 216 is decreased by aging. Here, the stator core 202 in the state shown in FIG. 9 is prevented from coming off downwardly by a structure in which the stator core 202 is contacted with the stator core receiving surface 201a.

Additionally, a connecting strength in an axial rotating direction between the housing 201 and the adhesive 216 is increased by inserting the adhesive 216 into the hole 214.

3. Third Embodiment

The shape of the annular wall 205b in the second embodiment may be a shape in which the annular wall 205b is inclined to an axial center as it goes upward in FIG. 8, that is, a shape having an inclined portion in which distance between the annular wall 205b and an inside wall of the housing 201 is gradually increased as it goes upward in FIG. 8. In this case, the cured adhesive 216 is contacted with the above inclined portion of the annular wall 205b. According to this structure, the cured adhesive 216 is engaged with this inclined portion, and the stator core 202 is prevented from coming off upwardly, even if the stator core 202 is pulled up from the housing 201 in the state shown in FIG. 9. Here, a similar effect is also obtained by forming the step portion at the outside of the annular wall 205b instead of the inclined portion. In addition, the similar effect is obtained by forming a concavity which is concave in a direction away from an inside wall of the housing 201 at the outside of the annular wall 205b, and by inserting the adhesive 216 into this concavity. Furthermore, a similar effect is obtained by forming a convexity or a convexo-concave structure at the outside of the annular wall 205b. Additionally, these structures may be used in combination.

4. Fourth Embodiment

The stator groove 202a may have a structure in which a concavity is formed at a part of the stator core 202 and adhesive is filled into the concavity. According to this structure, an anchor effect of the stator core 202 by the adhesive 216 is obtained, and the stator core 202 is more stably fixed. As a realized example of this structure, a structure in which a cutout structure is formed at a position facing the stator groove 202a on an approximately center tabular member of a plurality of tabular members for forming the stator core 202 and the stator core 202 is assembled, so that a portion having this cutout structure is formed as a concavity, can be used. Here, this structure may be used in combination with other structures disclosed in the present application.

5. Fifth Embodiment

In the stator groove 202a, a structure in which a convexity is formed at a part of the stator core 202 and is protruded into a cavity in which an adhesive is filled, may be used. As a realized example of this structure, a structure in which a position facing the stator groove 202a on an approximately center tabular member of a plurality of tabular members for forming the stator core 202 is protruded in a direction away from an axial center and the stator core 202 is assembled, so that this protruded portion is formed as a convexity, can be used. Here, this structure may be used in combination with other structures disclosed in the present application.

For example, by combining the Fourth Embodiment with the Fifth Embodiment, a convexo-concave structure along an axial direction can be formed at a portion facing the stator groove 202a of the stator core 202. According to this structure, the convexo-concave structure on the stator core 202 is engaged with the adhesive 216, and the stator core 216 and the adhesive 216 are more rigidly engaged.

6. Sixth Embodiment

In any one of the Second Embodiment to the Fifth Embodiment, fillers having low adhesive strength (or no adhesive strength) can be used instead of the adhesive 216. As a filler, resin based fillers for filling into a cavity can be used. In this case, portions denoted by reference numeral 216 are replaced by cured fillers (in the following, called filler 216).

For example, when the present Embodiment is applied to the Second Embodiment, the adhesive strength is not expected because the filler 216 is not an adhesive. However, the step portion 204a explained in the Second Embodiment is engaged with the cured filler 216. Therefore, the insulator 205 can be prevented from being pulled up, or the stator core 202 integrated with the insulator 205 can be prevented from moving upward.

In addition, for example, when the present Embodiment is applied to the Third Embodiment, the inclined portion of the annular wall 205b explained in the Third Embodiment is engaged with the cured filler 216. Therefore, the insulator 205 can be prevented from being pulled up, or the stator core 202 integrated with the insulator 205 can be prevented from moving upward.

Furthermore, for example, when the present Embodiment is applied to the Fourth Embodiment, the filler 216 is filled into the concavity formed at the portion of the stator groove 202a on the stator core 202 explained in the Fourth Embodiment, and the stator core 202 integrated with the insulator 205 can be prevented from moving upward by an anchor effect due to the filler 216.

Additionally, for example, when the present Embodiment is applied to the Fifth Embodiment, the convexity formed at the portion of the stator groove 202a on the stator core 202 explained in the Fifth Embodiment is protruded into the filler 216, and the stator core 202 integrated with the insulator 205 can be prevented from moving upward by an anchor effect due to the filler 216.

Other Matters

The housing 201 may be formed by resin molding. In addition, the convexity 213 may be changed to a concavity or a hole formed on the inner wall of the housing 201, as an engaging portion. In this case, the anchor effect occurs by inserting the adhesive 216 into the concavity or the hole formed on the inner wall of the housing 201 facing the stator groove portion 202a. The embodiment of the present invention is not limited to each of the above embodiments and includes various modifications that may be anticipated by a person skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof.

What is claimed is:

1. A resolver comprising:
    a stator having:
        a stator core having two sides in an axial direction;
        a pair of insulators, each respectively disposed on one of the sides of the stator core;
        a stator coil wound around the stator core; and
        a recess that is axially extended and formed on an outer peripheral surface of the stator core;
    a rotor arranged inside the stator;
    a housing arranged outside the stator, an inner peripheral surface of the housing facing the recess and having a convexity that projects into the recess;
    an engaging portion provided on an outer peripheral surface of the stator facing the convexity; and
    a filler filled into the recess that fixes the stator core to the housing;
    a step structure on the engaging portion, the step structure being formed between the stator core and the insulators,
    wherein the insulators project in a radially outward direction at both sides of the stator core in the engaging portion and the insulators hold the filler.

2. The resolver according to claim 1, wherein a receiving surface which supports the stator in the axial direction is provided on an inside of the housing, moving in the axial direction of the stator against the housing is controlled by the receiving surface, and moving in an opposite axial direction of the stator against the housing is controlled by the engaging portion.

3. The resolver according to claim 1, wherein the engaging portion includes at least one of an inclined portion, a step portion, a concavity and a convexity, provided on an outside of the stator facing the recess.

4. The resolver according to claim 1, wherein the housing is formed by aluminum die-casting.

5. The resolver according to claim 1, wherein the housing is made of resin.

6. The resolver according to claim 1, wherein the filler is an adhesive.

* * * * *